(12) United States Patent  
Alexiou

(10) Patent No.: US 7,424,273 B2  
(45) Date of Patent: Sep. 9, 2008

(54) EVALUATING PERFORMANCE OF A MULTIPLE-INPUT MULTIPLE OUTPUT (MIMO) COMMUNICATIONS LINK

(75) Inventor: Angeliki Alexiou, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 691 days.

(21) Appl. No.: 10/715,923

(22) Filed: Nov. 18, 2003

(65) Prior Publication Data

US 2005/0118958 A1   Jun. 2, 2005

(51) Int. Cl.
*H04B 7/02* (2006.01)
*H04B 7/00* (2006.01)
*H04L 1/02* (2006.01)

(52) U.S. Cl. .................... 455/101; 455/67.11; 375/267; 375/260

(58) Field of Classification Search ................ 455/101, 455/272, 277.1, 562.1, 226.1, 103, 67.11; 375/254, 267, 347
See application file for complete search history.

(56) References Cited

U.S. PATENT DOCUMENTS

| 6,801,580 | B2 * | 10/2004 | Kadous | ....................... | 375/267 |
| 7,006,810 | B1 * | 2/2006 | Winters et al. | ............ | 455/277.1 |
| 7,154,960 | B2 * | 12/2006 | Liu et al. | ..................... | 375/267 |
| 2004/0125900 | A1 * | 7/2004 | Liu et al. | ..................... | 375/347 |

FOREIGN PATENT DOCUMENTS

EP    GB 2 381 712    5/2003

OTHER PUBLICATIONS

G. J. Foschini, et al, "On Limits of Wireless Communications in a Fading Environment When Using Multiple Antennas", *Wireless Personal Communications 6*, (1998), pp. 311-335.
"System Simulations for MIMO Enhancements to HSDPA", 3GPP TSG RAN WG2, TSGR1#1 (00)XXXX, *Annex 1*, pp. 1-9.
"MIMO System Simulation Methodology", 3GPP TSG RAN WG1, R1-02-0142, pp. 1-10.
Andre P. des Rosiers, et al, "Space-Time Code Performance Bounds on Quasistatic Fading Channels," *IEEE International Conference on Communications*, NY, NY, vol. 1 of 5 (May 11, 2003), pp. 3160-3164.
Raymond Knopp, "On Coding for Block Fading Channels," *IEEE Transactions on Information Theory*, vol. 46, No. 1, (1-00), pp. 189-205.
Esa Malkamaki, et al, "Coded Diversity on Block-Fading Channels," *IEEE Transactions on Information Theory*, vol. 45, No. 2, (3-99), pp. 771-781.
European Search Report.

\* cited by examiner

*Primary Examiner*—Tilahun Gesesse

(57) ABSTRACT

A method is provided of evaluating the frame error probability (FER) of a selected communications link in a telecommunications network. The link is that between a MIMO transmitter comprising one of a base station or mobile user terminal, and MIMO receiver comprising the other of the base station or mobile user terminal. The method comprises determining values of instantaneous channel capacity of a MIMO channel of a mobile user terminal at multiple time instants over a predetermined time, processing the values to determining a level of channel capacity which any of the instantaneous channel capacity values has a predetermined probability of being less than, and looking up said level in predetermined calibration data of FER versus the channel capacity level so as to provide an FER value.

9 Claims, 2 Drawing Sheets

EVALUATING PERFORMANCE OF A MULTIPLE-INPUT MULTIPLE OUTPUT (MIMO) COMMUNICATIONS LINK

FIELD OF THE INVENTION

The present invention relates wireless communications, and more particularly, to a method of evaluating the frame error probability of a communications link in a wireless telecommunications network.

DESCRIPTION OF THE RELATED ART

In a telecommunications network, an improvement in performance of a communication link between a base station and a mobile user terminal does not necessarily result in a corresponding improvement in performance of the overall network. Accordingly, to evaluate the overall improvement caused by, for example, introducing Multiple Input Multiple Output (MIMO) signalling between mobile user terminals and base stations, the improvement in performance of a large sample of links connecting base stations and mobile user terminals needs to be evaluated.

It is difficult to accurately characterise performance of particular links. Such performance has traditionally been evaluated in terms of frame error probability, which is often referred to as frame error "rate" and denoted FER, as a function of signal-to-interference plus noise ratio (SINR), averaged over all transmission channel states. Interference, of course, here refers to the interfering signals from other cells, and noise is thermal noise. Frame error probability (FER) is the probability that a received frame includes at least one error; that is at least one received bit is not as sent. Calibration curves of FER versus SINR are produced and used to evaluate link-level performance. This is adequate for circuit-switched voice-centric radio networks where many channel states are encountered over a unit time, such as the duration of a coding-block.

However, it was known that for radio networks running significantly more data applications, due to the bursty nature of packet switched calls, typically only a small number of channel states are encountered within the duration of a coding-block. Consequently, it had been realised that FER averaged over all channel states encountered during transmission of a coding-block is not a good representation of receiver performance for packet switched calls. It had also been realised that a simple scalar SINR is not a suitable variable with which to characterise a MIMO scenario, where, for example, some spatial correlation between the multiple transmit and receive antennas occurs. Accordingly, a second known approach was developed in which the system-level parameters for a mobile user terminal in a packet radio system are related to performance at communication link level by determining MIMO channel capacity which is then used to indicate frame error probability.

Known Approach

In the second known approach referred to previously, system-level parameters for a mobile user terminal in a packet radio system are related to performance at communication link level by a variable C which is used to estimate the performance of the receiver in terms of frame error probability from pre-computed calibration data.

Consider a multiple input multiple output (MIMO) system by way of example. MIMO techniques are well known, and the reader is referred to, for example, S. M. Alamouti, "A Simple Transmit Diversity Technique for Wireless Communications", IEEE Journal on Selected Areas in Communication, Vol. 16, No. 8, pp. 1451-1458, October 1998 as background.

A MIMO system 12 is shown in FIG. 2 consisting of a MIMO transmitter 14 having N transmit antennas 16 and a MIMO receiver 18 having M receive antennas 20. The transmitter 14 is one of a base station and a mobile user terminal. The corresponding MIMO receiver 18 is the other of the base station and the mobile user terminal. A data block to be transmitted is encoded and modulated to provide symbols of a complex constellation. Each symbol is then mapped to the transmit antennas 16 (a process known as spatial multiplexing) after some spatial weighting of the signal components to the various transmit antennas, known in the art as space-time coding. After transmission over air, i.e. through the wireless channel, signals received at the receiver by the various receive antennas 20 are demultiplexed, weighted, demodulated and decoded in order to recover the transmitted data.

In this MIMO system 12, a radio packet is received via the NxM channel matrix H, in the presence of additive white Gaussian noise of energy $N_o$, $E_b$ being the bit energy. Specifically the frame error probability (FER) (for a particular communication link, is derivable from the channel matrix H, interference channel matrices $H_1 \ldots H_K$ and thermal noise energy $N_o$. No structured (i.e. systematic) interference is assumed present so $H_1, \ldots, H_K$ are not considered.

Many computer simulations of the MIMO system 12 were run, specifically of the extent to which a transmitted frame 22 would be received for the selected H and selected average signal to noise ratio (Eb/No), the instantaneous noise varying randomly over time around an average with a Gaussian distribution. For each simulation, comparison of the simulated-received frame 24 to the simulated-transmitted frame 22 enabled a count to be made of what fraction of the simulated-received frames included at least one error, thus giving a frame error probability (FER) value.

The next step is to determine the channel capacity C to which the FER value is related. This was done by assuming FER to be a function of variable C as follows:

$$FEP = Pr\left\{\text{Frame Error} | H, \frac{E_b}{N_o}\right\} = f(C(H, E_b, N_o)) \quad (1)$$

enabling calibration curves of the form FER(C) to be produced where $$C = C(H, E_b, N_o) \quad (2)$$

is a scalar variable. C is channel capacity of the MIMO channel H, and is determined from a MIMO channel matrix H as:

$$C = \log_2 \det\left(I_N + \frac{1}{M}\frac{E_b}{N_o}HH^H\right) \quad (3)$$

(This is the so-called Shannon capacity formula extended to the MIMO case). C is the channel capacity expressed in bits per second per Hertz (bps/Hz) for a MIMO channel H with N transmit antennas, M receive antennas, and an average signal to noise ratio of Eb/No.

Accordingly, from the above-mentioned simulations, data of FER against C were produced for various average signal to noise ratio. These data are look-up data i.e. calibration data to be used to estimate FER for real MIMO systems from determination of a C value.

The use of the variable C to determine FER for a link of a real network is shown in FIG. 3. For example, by sampling at regular time intervals (e.g. once per slot) how signals, namely pilot signals, expected by a mobile user terminal are received by the mobile user terminal, a series of "instantaneous" channel matrices H for the mobile user terminal of interest at different times is provided.

For each such "instantaneous" channel matrix H for the mobile user terminal of interest, the interface variable C is evaluated in a processor 26 for the particular mobile user terminal of interest using Equation (3). The value of variable C is then used to estimate FER for that link by looking up the pre-computed link level FER versus C and Eb/No calibration data stored in a memory 28. This is done for each link of interest.

SUMMARY OF THE INVENTION

An embodiment of the present invention is a method of evaluating frame error probability (FER) of a communications link in a wireless telecommunications network. The link is between a MIMO transmitter comprising one of a base station or mobile user terminal, and MIMO receiver comprising the other of the base station or mobile user terminal. The method comprises determining values of instantaneous channel capacity of a MIMO channel of a mobile user terminal at multiple time instants over a predetermined time, processing the values to determine a level of channel capacity which any of the instantaneous channel capacity values has a predetermined probability of being less than, and looking up said level in predetermined calibration data of frame error probability (FER) versus channel capacity level so as to provide an FER value.

Example embodiments provide a way of evaluating the performance of particular links in MIMO systems in the presence of a fading channel (i.e. non-zero Doppler shift), specifically by translating high level parameters, namely channel matrix and average signal to noise ratio (Eb/No) for a mobile user terminal linked to a base station, into frame error probability (FER), which is a measure of link level performance. This approach is suitable for fast fading channels (non-zero Doppler) being sensitive to the variations over time of the MIMO channel.

Another embodiment of the present invention relates to a wireless telecommunications network comprising a MIMO transmitter comprising one of a base station or mobile user terminal and MIMO receiver comprising the other of the base station or mobile user terminal. The network includes a processor operative to determine values of instantaneous channel capacity of a MIMO channel of the mobile user terminal at multiple time instants over a predetermined time, and to process the values so as to determine a level of channel capacity which any of the instantaneous channel capacity values has a predetermined probability of being less than. The network includes a look-up memory of predetermined calibration data associating frame error probability (FER) with channel capacity level and an indicator operative to give an indication proportional to the FER corresponding to the level of channel capacity determined.

BRIEF DESCRIPTION OF THE DRAWINGS

An illustrative embodiment of the present invention will now be described by way of example and with reference to the drawings, in which.

DETAILED DESCRIPTION

For ease of explanation, an example of a known approach was described in the "Description of the Related Art" section. This is now followed by an example of the approach according to the invention. This is for ease of comparison.

Example Approach

The inventor realised that, in the known approach, being based on instantaneous system level parameters, the C variable value for a link to a particular mobile user terminal is produced without taking into account so-called multipath or other fast fading characteristics. For static channels, such as a static Additive White Gaussian Noise (AWGN) channel, i.e. a channel without fading, this channel capacity variable C is accurate, but this is not the case for fast fading channels. The inventor realised that as fast fading is related to differences in phase between successive channel samples, to consider fading (i.e. the effect of Doppler shift) would require adapting the variable C to make the variable dependent on channel variations over a timeslot or a frame. In other words, a variable was required that is a function of the differing instantaneous states of the MIMO channel matrix over a period of time, namely the time for transmission of a coding-block. This is explained further in the rest of this description below, all of which describes an approach according to the present invention.

Generating Calibration Data

Figure 2:
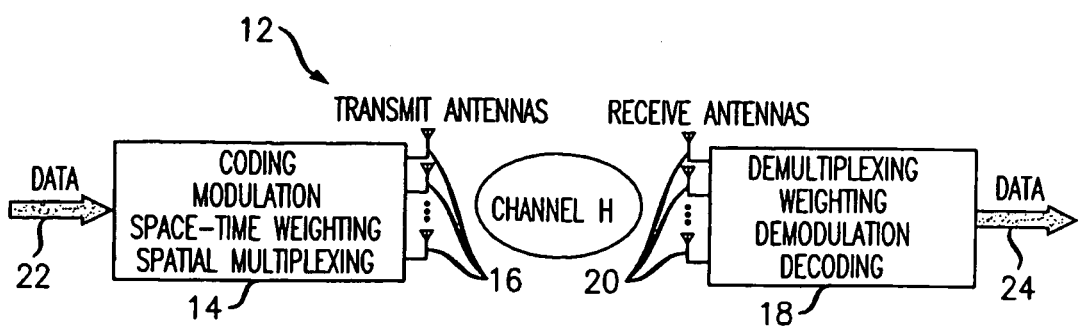
FIG. 2 is a diagram illustrating a MIMO transmitter and a MIMO receiver (PRIOR ART)

A MIMO system was considered as shown in FIG. 2 with a MIMO transmitter 14 having N transmit antennas 16 and a MIMO receiver 18 having M receive antennas 20, where a radio packet is received via the N×M channel matrix H, in the presence of additive white Gaussian noise of energy $N_o$, $E_b$ being the bit energy. The frame error probability (FER) for a particular mobile user terminal, is related to the user's channel matrix H, interference channel matrices $H_1 \ldots H_K$ and instantaneous thermal noise energy $N_o$. No structured (i.e. systematic) interference is assumed present so $H_1 \ldots, H_K$ are not considered.

Many computer simulations of the MIMO system 12 were run, specifically as to the extent to which a simulated transmitted frame 22 would be received for the selected H and selected average signal to noise ratio (Eb/No), the instantaneous noise (No) varying randomly around an average with a Gaussian distribution. For each simulation, comparison of the simulated-received frame 24 to the simulated-transmitted frame 22 enabled a count to be made of what fraction of the simulated-received frames included at least one error, thus giving the frame error probability (FER) value.

The next step was to determine the channel capacity C to which the FER value related. This was done by assuming FER to be a function of channel capacity C as follows:

$$FEP = Pr\{\text{Frame Error} | H, \frac{E_b}{N_o}\} = f(C(H, E_b, N_o)) \quad (4)$$

where an instantaneous value of channel capacity C is determined from a MIMO channel matrix H as:

$$C = \log_2 \det\left(I_N + \frac{1}{M}\frac{E_b}{N_o}HH^H\right) \quad (5)$$

(This is the so-called Shannon capacity formula extended to the MIMO case). C is the channel capacity expressed in bits per second per Hertz (bps/Hz) for a MIMO channel H with N transmit antennas, M receive antennas, and an average signal to noise ratio of Eb/No.

There is then a significant difference from the known approach, namely in order to consider fast fading (Doppler), a function denoted $C_s$ which is a stochastic (i.e. probabilistic) function of C during the time period of interest (e.g. a coding block), was determined from the simulation results. This is derived from a Cumulative Density Function (CDF) of the instantaneous values of variable C which can be considered as describing the variation of the variable C over a coding block. This $C_s$ is as follows:

$$C_s = \arg_{C_o}\{Pr(C < C_o) = a\} \quad (6)$$

Figure 5:
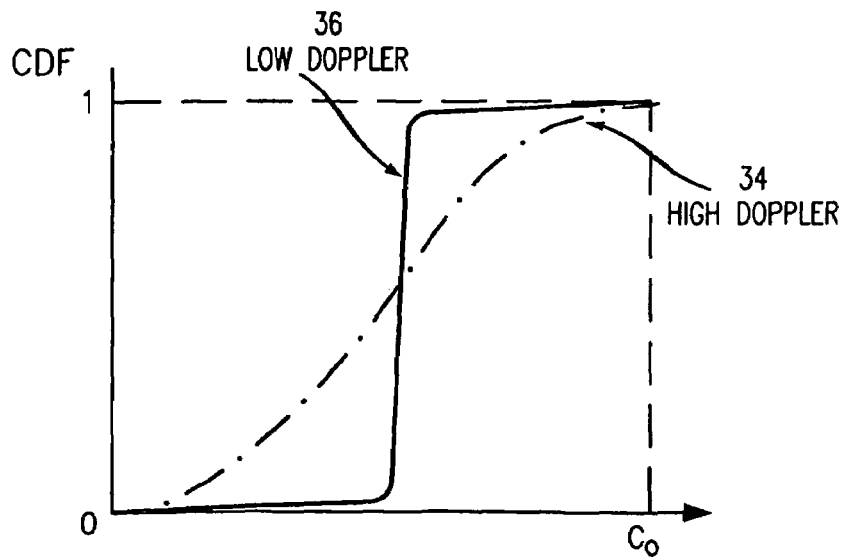
FIG. 5 is a diagram illustrating graphically a Cumulative Density Function of a channel capacity C for low Doppler shift and high Doppler shift scenarios.

This means that $C_s$ is the value of C for which C is below certain level $C_o$ with probability a. The cumulative density function in respect of C takes the form shown in FIG. 5, and the $C_s$ depends on the selected a value. In use a single value of a is selected so as to produce $C_s$ values. In a high Doppler scenario (indicated in FIG. 5 by reference numeral 34), any value of a is suitable, e.g. 0.3, 0.5, or 0.7. In a low Doppler scenario (indicated in FIG. 5 by reference numeral 36), a value of a near or at 0.5 is most suitable, as shown in FIG. 5, as it is there that the CDF and hence $C_s$ is most sensitive to C.

From the many simulations with various channel matrices H each with various instantaneous noise No, various FER versus Cs were determined for various average signal to noise ratios (Eb/No). Many simulations were run sufficient to enable look-up tables, i.e. calibration curves to be produced, from which FER could be read off for particular combinations of Cs and Eb/No.

Using the Calibration Data

Figure 1:
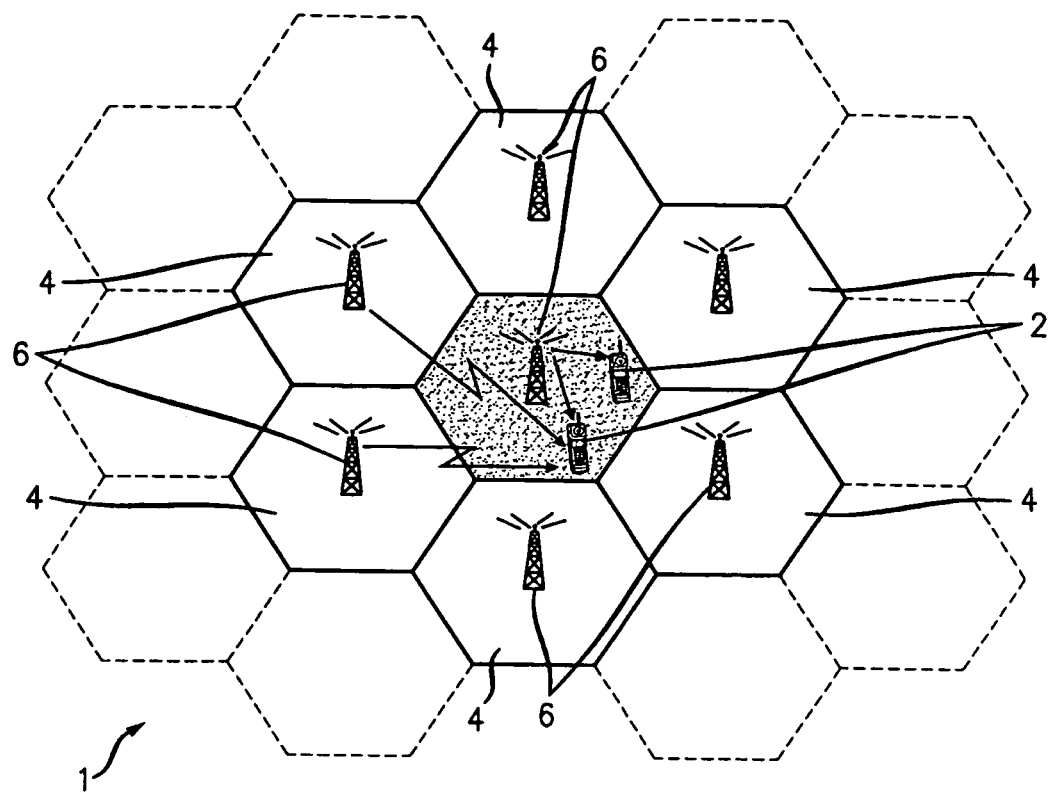
FIG. 1 is a diagram illustrating a network for mobile telecommunications including multiple cells (PRIOR ART)

A network of cells is considered as shown in FIG. 1 with at least several mobile user terminals 2 within each cell 4. Each cell 4 is served by a base station 6 The instantaneous state of the network 1 is described by all the channel matrices corresponding to all the links between mobile user terminals and bast stations.

By sampling at regular time intervals (e.g. once per slot) how signals, namely pilot signals, expected by a mobile user terminal are received by the mobile user terminal, a series of "instantaneous" channel matrices H for the mobile user terminal of interest at different times is provided.

Figure 4:
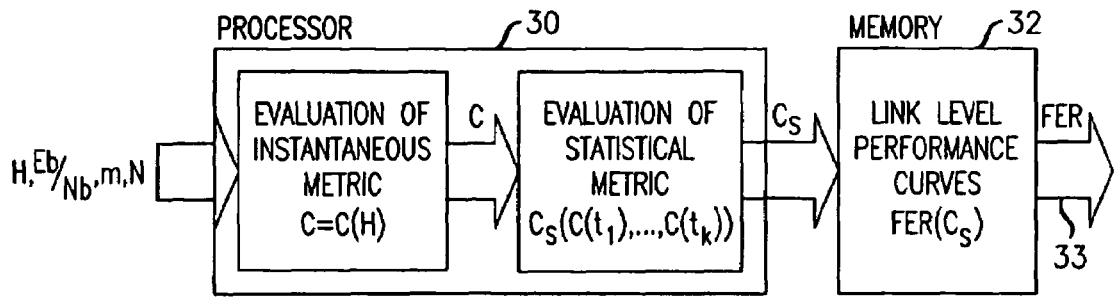
FIG. 4 is a diagram illustrating determination of FER in a preferred embodiment.

The method of determining link level performance (in terms of FER) from system level parameters (channel matrix H, average signal to noise ratio Eb/No) for a mobile user terminal in a real network involving MIMO links is shown schematically in FIG. 4. For the mobile user terminal of interest, variable C value is evaluated in processor 30 using Equation (5) for each such "instantaneous" channel matrix H This is done repeatedly over a period of time, namely the duration of a coding block, and the values of variable C are collected, and the variable CS is estimated by the processor 30 using equation (6) for that link (i.e. that mobile user terminal) and that time period. The value of $C_s$ is then used to estimate FER by looking up the pre-computed FER corresponding to the CS and Eb/No data, i.e. frame error probability versus $C_s$ curves for various Eb/No that are stored in a memory 32. The FER value is provided at an output port 33 of the memory 32. (Where appropriate, interpolation between calibration data of FER as a function of Cs and Eb/No is undertaken) As $C_s$ is a function of fast fading (i.e. Doppler), it can adequately account for fast fading in evaluating performance of specific links. The processor 30 and lookup table 32 with its output port are in the base station, although in other embodiments (not shown) these can be located elsewhere in the network, e.g. at a base station controller or other node.

FER is determined in this way for each of MIMO links in a wireless telecommunications network, or optionally just those links selected to be representative or of particular interest. The set of FER values resulting gives an indication of overall system performance, useful for e.g. network apparatus upgrade.

As Doppler shift increases, i.e. fast fading becomes more significant, the absolute value of the slope of the CDF function given in Equation (4) decreases. In other words the variance of the variable C over an interleaving block increases when Doppler increases. Consequently, $C_s$ given in equation (4) is a decreasing function of the amount of Doppler shift for probabilities a<0.5 and an increasing function of the amount of Doppler shift for a>0.5. When a=0.5, the interface variable $C_s$ is equivalent to the mean of the instantaneous variable over the period of interest (e.g. coding block).

Figure 3:
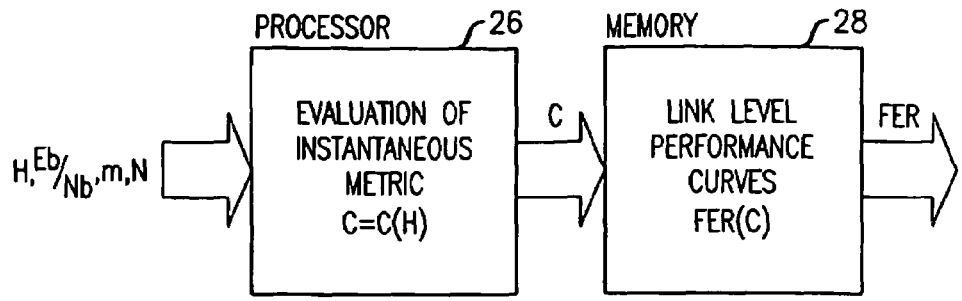
FIG. 3 is a diagram illustrating determination of FER (PRIOR ART)

The variable $C_s$ is backwards compatible with (i.e. gives the same results as) the known approach (described above and illustrated in FIG. 3) in the case of the channel being static, i.e. when Doppler shift is zero. This is because then the instantaneous variable C remains constant and therefore for any value of the probability a, $C_s$ is equal to the constant value C.

The invention claimed is:

1. A method of evaluating frame error probability (FER) of a selected communications link in a wireless telecommunications network, the link being between a MIMO transmitter comprising one of a base station or mobile user terminal, and a MIMO receiver comprising the other of the base station or mobile user terminal, the method comprising determining values of instantaneous channel capacity of a MIMO channel of a mobile user terminal at multiple time instants over a predetermined time, processing the values to determine a level of channel capacity such that any of the instantaneous channel capacity values is to a predetermined probability below that level, and looking up said level in predetermined calibration data of FER versus the channel capacity level so as to provide an FER value.

2. A method according to claim 1, in which the predetermined probability is 0.5 so the level of channel capacity selected is the mean of the instantaneous channel capacity values in the predetermined period.

3. A method according to claim 1, in which the predetermined calibration data of FER versus level of channel capacity is provided by mathematical modelling of a MIMO transmitter and MIMO receiver with various channel matrix states and various average signal to noise ratios.

4. A method according to claim 1, comprising estimating average signal to noise ratio experienced by the mobile user terminal during the predetermined time period, and also using this to evaluate FER, the predetermined calibration data being FER as a function of both channel capacity level and average signal to noise ratio.

5. A method according to claim 1, including calculating each value of instantaneous channel capacity from parameters including the channel matrix state of the link, and the average signal to noise ratio experienced by the link at that time.

6. A method of providing a set of FER values indicative of system level performance of at least part of a telecommunications network, said at least part including MIMO communications links between base stations and mobile user terminals, the method comprising: for each of at least some of said communications links evaluating frame error rate using the method of determining values of instantaneous channel capacity of a MIMO channel of a mobile user terminal at multiple time instants over a predetermined time, processing the values to determine a level of channel capacity such that any of the instantaneous channel capacity values is to a predetermined probability below that level, and looking up said level in predetermined calibration data of FER versus the channel capacity level so as to provide an FER value.

7. A wireless telecommunications network comprising a MIMO transmitter comprising one of a base station or mobile user terminal and MIMO receiver comprising the other of the base station or mobile user terminal, and a processor operative to determine values of instantaneous channel capacity of a MIMO channel of the mobile user terminal at multiple time instants over a predetermined time and to process the values so as to determine a level of channel capacity such that any of the instantaneous channel capacity values is to a predetermined probability below that level, the network including a look-up memory of predetermined calibration data associating frame error probability (FER) with channel capacity level and an indicator operative to give an indication proportional to the FER corresponding to the level of channel capacity determined.

8. A station for wireless telecommunications comprising a processor operative to evaluate frame error probability (FER) between a MIMO transmitter comprising one of a base station or mobile user terminal and MIMO receiver comprising the other of the base station or mobile user terminal, the processor being operative to determine values of instantaneous channel capacity of a MIMO channel of the mobile user terminal at multiple time instants over a predetermined time and to process the values so as to determine a level of channel capacity such that any of the instantaneous channel capacity values is to a predetermined probability below that level, the station including a look-up memory of predetermined calibration data of FER versus channel capacity level and an indicator of the FER value corresponding to the level of channel capacity determined.

9. A station according to claim 8, which is a base station.

\* \* \* \* \*